[11] 3,582,637

| [72] | Inventor | John Cecil, Jr.<br>Skaneateles |
|---|---|---|
| [21] | Appl. No. | 795,008 |
| [22] | Filed | Jan. 29, 1969 |
| [45] | Patented | June 1, 1971 |
| [73] | Assignee | Welch Allyn, Inc.<br>Skaneateles Falls, |

[54] MOUNTING ARRANGEMENT FOR A FIBER OPTIC READER AND LAMP ASSEMBLY
2 Claims, 5 Drawing Figs.

[52] U.S. Cl. .................................................. 240/1EL, 350/96B
[51] Int. Cl. ................................................... G02b 5/14
[50] Field of Search ....................................... 240/1 EL, 8.4, 8.41; 350/96, 96 B

[56] References Cited
UNITED STATES PATENTS

| 2,586,723 | 2/1952 | Sakols | 240/1 E.I. X |
| 2,827,557 | 3/1958 | Neugass | 240/1 E.I. X |
| 3,091,235 | 5/1963 | Richards | 350/96 B UX |
| 3,300,269 | 1/1967 | Schultz | 350/96 X |

FOREIGN PATENTS

| 832,456 | 2/1952 | Germany | 240/1 E.I. |

*Primary Examiner*—Samuel S. Matthews
*Assistant Examiner*—Robert P. Greiner
*Attorney*—Bruns and Jenney ABSTRACT: A device for supporting a lamp in optimum position for directing light into the input surface of a fiber optic reader. Visual inspection for lamp incandescence is made possible by exposing a portion of the lamp envelope to view. Gasket means in the device coacting with the lamp effectively seals off the lamp lens, the reader input surface and the area in between from dust or other foreign matter. The gasket means also operates as a vibration dampener for the lamp.

PATENTED JUN 1 1971 3,582,637

INVENTOR.
JOHN CECIL JR.

BY Bruns & Jenney,
Attorneys

MOUNTING ARRANGEMENT FOR A FIBER OPTIC READER AND LAMP ASSEMBLY

BACKGROUND OF THE INVENTION

This invention relates generally to an optical reading device for use with data processing equipment, and has particular reference to a novel mounting arrangement for a fiber optic reader and lamp assembly.

In prior art devices of the type with which the invention is concerned, the reading apparatus may be provided with a plurality of separate light emitting fiber optic bundles for detecting the presence of punched holes in punch cards, there being one such bundle for each data bit channel on the card. The light source for each bundle is a lamp at its input end, and the lamps are usually mounted in the device in such a way that a failure of one of them may not be readily apparent to an operator. Obviously, if even one lamp is out, the device is rendered completely unreliable.

In addition to the possibility of a serious problem with lamp failure, some of the prior devices do not have adequate provision for the dissipation of the heat produced by the lamps which can ultimately result in damage to the equipment. Also, in some prior art devices, the lamp and the input end of the fiber optic bundle are not correlated in a way that permits the most effective use of the available light.

SUMMARY OF THE INVENTION

The invention provides a mounting arrangement for a reading device wherein the light input end of each fiber optic bundle and its lamp are received in the opposite ends of a sleeve member which insures proper axial alignment of the lamp and bundle and also permits adjustment of the axial spacing between the two. The lamp filament is enclosed by a substantially cylindrical glass envelope, and the sleeve member is formed with one or more apertures adjacent the envelope to enable lamp operability to be determined by visual inspection. However, because the inspection apertures permit the entrance of dust and other foreign matter into the sleeve, means are provided to seal off the light emitting end of the lamp and light input end of the fiber optic bundle. The sealing means is a resilient gasket which additionally operates as a vibration dampener for the lamp.

While the portion of the reading device that contains the fiber optic bundle is preferably made of plastic, the sleeve member is desirably formed of metal. The lamp base is also metal and threadedly engages the sleeve whereby a substantial amount of thermal conduction area is provided to carry off heat produced by the lamp. Effective dissipation of the heat is also aided by the inspection apertures in the sleeve which permit direct radiation from the lamp envelope.

DESCRIPTION OF THE PREFERRED EMBODIMENT

Figures 1, 2:
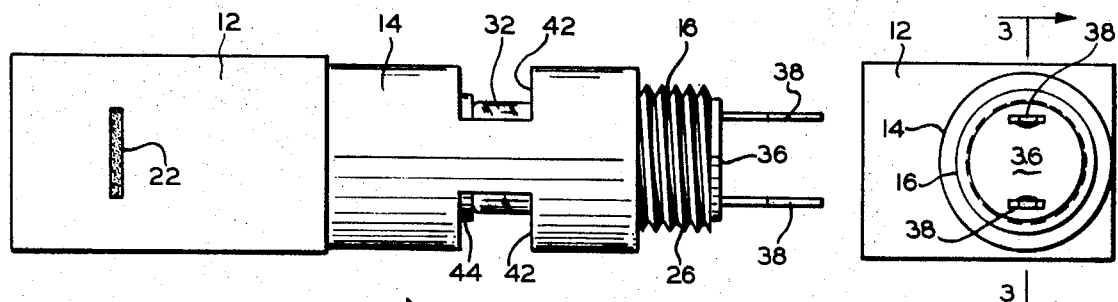
FIG. 1 is a side elevation of a reader and lamp assembly embodying the invention.
FIG. 2 is a right end elevation of the assembly of FIG. 1.

Referring now to the drawings, wherein like reference numbers indicate the same part in each of the views, 10 generally indicates a component of an optical reading device which is essentially comprised of a reader element 12, a sleeve member 14 and a lamp 16. The reader element contains a bundle 18 of clad glass or plastic optical fibers, said fibers being commercially available and being characterized by their ability to transmit light from one end to the other with minimum light loss. The bundle 18 is preformed into the desired configuration, the fibers comprising the bundle being held together by an epoxy or other suitable means.

In the illustrated embodiment of the invention, the light input end 20 of the fiber optic bundle has a cylindrical configuration and the light output end 22 has a rectangular configuration. Both ends are optically ground and polished. As stated, the bundle is preformed and the reader body, which is preferably of plastic, is then molded around it. While but a single component 10 is shown in the drawings, it will be understood that the reading device will incorporate a plurality of such components, each having its own fiber optic bundle and lamp, there being at least as many components as there are data bit channels on the media being processed.

Figure 4:
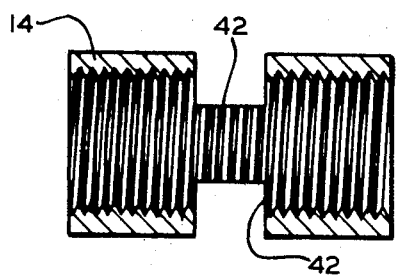
FIG. 4 is a vertical longitudinal section through the sleeve member.
Figure 5:
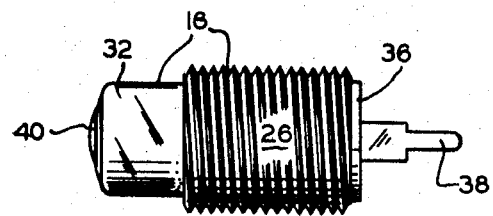
FIG. 5 is a side elevation of the lamp.

The reader element 12 is formed with a threaded cylindrical boss 24 which surrounds the input end 20 of the fiber optic bundle in concentric relation thereto. The sleeve member 14 is internally threaded throughout its length, FIG. 4, and at one end engages the boss as shown. The other end of the sleeve receives the threaded metal base 26 of lamp 16. The lamp includes a filament 28 connected to the ends of a pair of lead in wires 30, and the filament and wires are enclosed in a cylindrical glass envelope 32, a portion of which is telescopically received in the lamp base 26.

The lead in wires 30 pass through a glass plug 34 sealed to the inner end of the glass envelope 32 and then through a plug 36 of resilient material that is secured in the end of the lamp base. Plug 36 supports a pair of metal terminal strips 38 to which the outer ends of wires 30 are soldered. The outer end of the glass envelope 32 is closed by a lens 40, the lens being secured in sealed relation to the envelope by any suitable means. The lens forms the principal light emitting surface of the lamp, and this type of lamp construction permits the use of the lens having the best suited characteristics for the particular application of the lamp.

Figure 3:
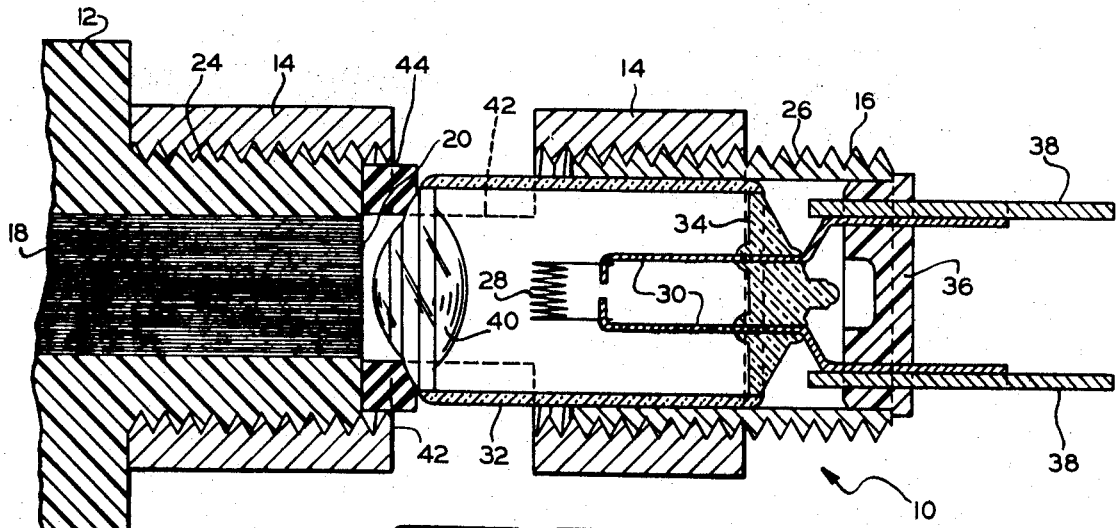
FIG. 3 is an enlarged, fragmentary vertical section through the assembly taken on line 3–3 of FIG. 2.

Adjacent the lamp envelope, portions of the sidewall of the sleeve member 14 are cut away to form apertures 42. These apertures enable it to be determined that the lamp is operable either by visual inspection or by some other means such as a circuit employing a photocell. It can be seen that without the apertures 42, and with the lamp inserted in the sleeve member as shown in FIG. 3, it would be difficult to detect a lamp failure in a device where the light output end 22 of the fiber optic bundle is located so as to be concealed from view.

The provision of the apertures 42, while permitting positive lamp inspection, does allow foreign matter such as card dust to enter the sleeve member. To prevent this foreign matter from being deposited on the light emitting end 40 of the lamp, sealing means are provided in the form of a resilient ring or gasket 44 of silicone rubber or the like. As indicated in FIG. 3, the gasket encircles the outside face of the lens 40 and occupies the space between the lens periphery and the inside wall of the sleeve so that the lens face, input end 20 of the fiber optic bundle and the space in between are effectively sealed off from the inspection apertures 42.

In addition to its sealing function, the gasket 44 operates as an effective vibration dampener for the lamp, its engagement with the end of the lamp operating to minimize transmission to the lamp of vibrations in the device caused by card movement, etc. In this connection, when the gasket is compressed by threading the lamp into engagement with it, the resiliency of the gasket causes it to exert opposite forces on the lamp lens and reader element boss 24, which forces tend to push both the lamp and boss out of the sleeve 14 and thus "load" or lock the threads of both with respect to the sleeve threads. This action, due to the compressibility of the gasket, has a further vibration dampening effect on the assembly.

As noted above, the cylindrical input end 20 of the fiber optic bundle and the boss 24 are concentric, and with the boss and lamp being threaded into the same cylindrical sleeve, axial alignment of the bundle, lamp lens and lamp filament is insured. This, of course, assumes a lamp 16 with precisely centered filament and lens, and such lamps have been constructed and are available. The sleeve assembly of the parts also permits limited but adequate adjustability of the axial spacing between the lamp lens and end of the fiber optic bundle within the compressive range of the gasket 44.

In order to effectively dissipate the heat produced by the lamp 16, the sleeve member 14 and lamp base 26 preferably are both made of metal. The threaded connection between the two parts thus provides a substantial thermal conduction area for carrying off the heat. In addition, heat dissipation is also materially aided by the inspection apertures 42 which permit direct radiation from the lamp envelope. While the gasket 44 is in direct contact with the lamp lens, the silicone rubber from which the gasket is made can withstand the heat of the lamp without deterioration.

With the sleeve assembly arrangement disclosed herein, the same sleeve, lamp, sealing means, etc. can be used with any reader element 12 as long as its boss has the same diameter and threads as the boss 24 whereby the boss can be threaded into the sleeve. Thus, the reader element can have different shapes from that shown, and the light output end 22 of the fiber optic bundle can have any required configuration or location.

From the foregoing description it will be apparent that the invention provides a novel and very practical mounting arrangement for an optical reader and lamp assembly. As will be understood by those familiar with the art, the invention may be embodied in other specific forms without departing from the spirit or essential characteristics thereof. The embodiment disclosed is, therefore, to be considered in all respects as illustrative rather than restrictive, the scope of the invention being indicated by the appended claims.

What I claim is:

1. In an assembly including an optical reader and a lamp, the reader having light transmitting means therein with light input and output ends, a sleeve member releasably connected to the reader with one of its ends enclosing the input end of the light transmitting means in coaxial relation thereto, the lamp being received in the other end of the sleeve member in coaxial relation to the input end of the light transmitting means, the sleeve being formed with an aperture for visual inspection of the lamp mounted therein, and sealing means between the sleeve and lamp to prevent dirt entering the sleeve through the aperture from being deposited on the principal light emitting surface of the lamp, the sealing means being a resilient annular gasket encircling the light emitting end of the lamp.

2. In a fiber optic reader and lamp assembly, the reader having a preformed fiber optic bundle therein with light input and output ends, a sleeve member threadedly engaging the reader so as to enclose the input end of the fiber optic bundle, the lamp also being threadedly engaged with the sleeve member so that its light emitting end is enclosed by the member in spaced relation to the light input end of the reader bundle, the filament of the lamp being enclosed in a substantially cylindrical glass envelope the light emitting end of which is a lens, the sleeve member having an aperture in the sidewall thereof for enabling visual determination of lamp operability, and a resilient sealing element positioned between the sleeve member and lamp end to prevent dirt entering the sleeve through the aperture from being deposited on the light emitting end of the lamp, the sealing element having an annular configuration and occupying the space between the periphery of the lens and the inside wall of the sleeve member.